United States Patent [19]

Murota

[11] Patent Number: 5,222,418
[45] Date of Patent: Jun. 29, 1993

[54] PRESSURIZED FLUID SUPPLY SYSTEM FOR AUTOMATIC POWER TRANSMISSION FOR AUTOMOTIVE VEHICLE

[75] Inventor: Kazuya Murota, Ebina, Japan

[73] Assignee: Nissan Motor Co., Ltd., Yokohama, Japan

[21] Appl. No.: 733,123

[22] Filed: Jul. 19, 1991

[30] Foreign Application Priority Data

Jul. 21, 1990 [JP] Japan .................. 2-191879

[51] Int. Cl.$^5$ ............................................. F16H 57/04
[52] U.S. Cl. ........................................ 74/867; 74/467; 184/6.12; 475/159
[58] Field of Search .................. 74/467, 867; 475/159; 184/6.12

[56] References Cited

U.S. PATENT DOCUMENTS

| | | | |
|---|---|---|---|
| 2,211,154 | 8/1940 | Oshei | 74/606 X |
| 3,508,630 | 4/1970 | Keller et al. | 74/467 X |
| 3,926,075 | 12/1975 | Kronstadt | 74/867 |
| 4,106,361 | 8/1978 | Burtis | 475/344 X |
| 4,352,301 | 10/1982 | Fleury | 74/467 |
| 4,425,817 | 1/1984 | Wells et al. | 74/467 |
| 4,435,990 | 3/1984 | Chalmers | 74/467 X |
| 4,721,185 | 1/1988 | Weigle | 184/6.12 |
| 4,922,765 | 5/1990 | Hayakawa et al. | 74/467 X |
| 5,031,725 | 7/1991 | Millar | 475/159 X |
| 5,085,100 | 2/1992 | Duello | 74/467 X |
| 5,092,196 | 3/1992 | Kameda et al. | 74/467 X |
| 5,105,911 | 4/1992 | Atkinson | 184/6.12 |
| 5,107,718 | 4/1992 | Inagawa | 184/6.12 X |
| 5,115,887 | 5/1992 | Smith | 184/6.12 X |
| 5,121,815 | 6/1992 | Francois et al. | 184/6.12 X |

OTHER PUBLICATIONS

Service Manual for RE4R01A-type Automatic Transmission, issued by Nissan Motor Co., Ltd., 1987.
Service Manual for W4A040-type Automatic Transmission, issued by Daimlar Benz A.G.

Primary Examiner—Leslie A. Braun
Assistant Examiner—David E. Henn
Attorney, Agent, or Firm—Foley & Lardner

[57] ABSTRACT

A novel hydraulic system for an automotive automatic power transmission improves efficiency of working fluid supply for controlling transmission operation and for lubricating transmission components. The hydraulic system employs independently fabricated lubrication circuit for lubricating transmission components and a hydraulic control circuit for controlling operation of transmission components. The hydraulic system employs a first fluid pump connected to the hydraulic control circuit for supplying working fluid thereto, and a second fluid pump connected to the lubrication circuit for supplying working fluid thereto, and operative independently of the first fluid pump.

13 Claims, 7 Drawing Sheets

FIG_2

FIG_4A
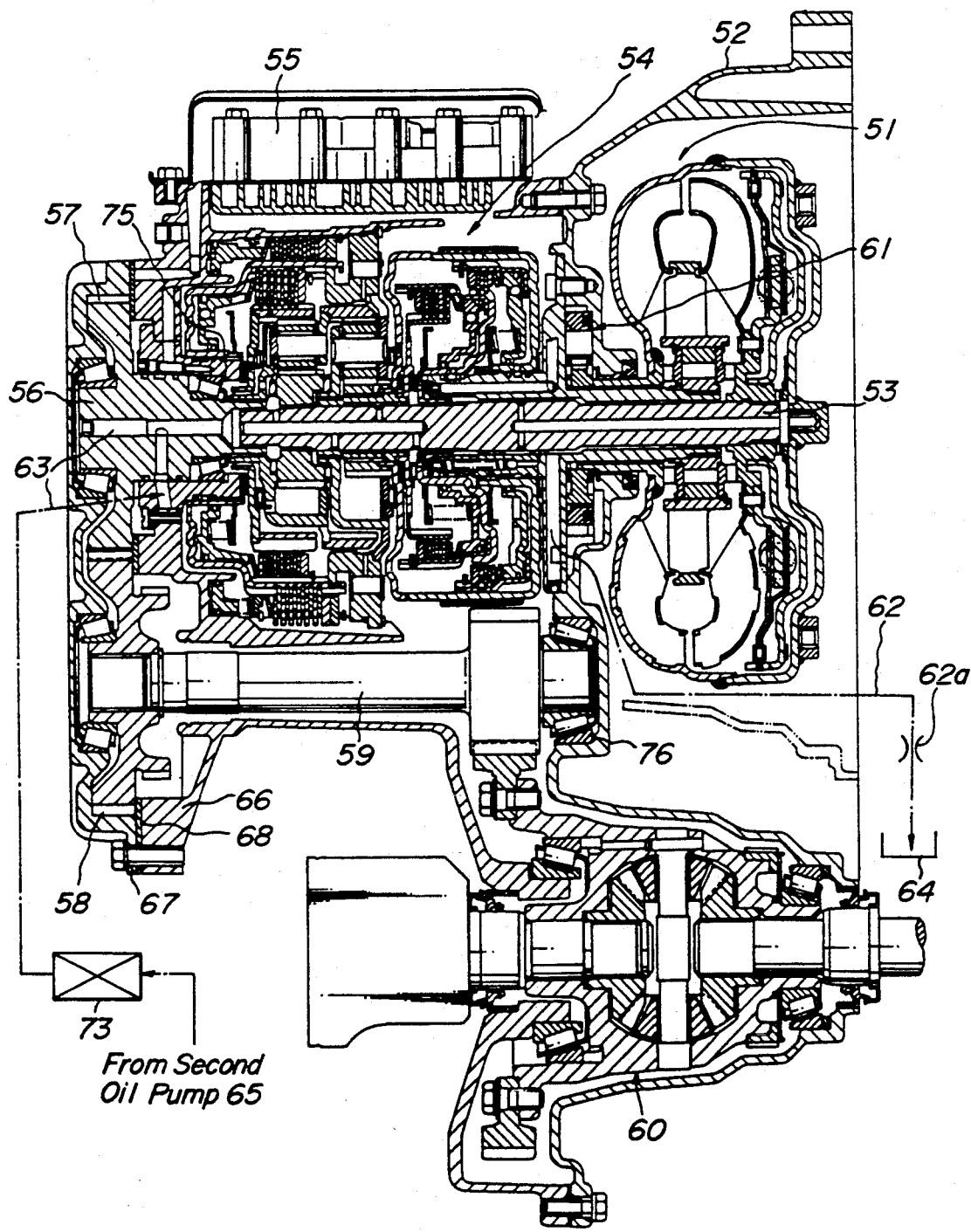
From Second
Oil Pump 65

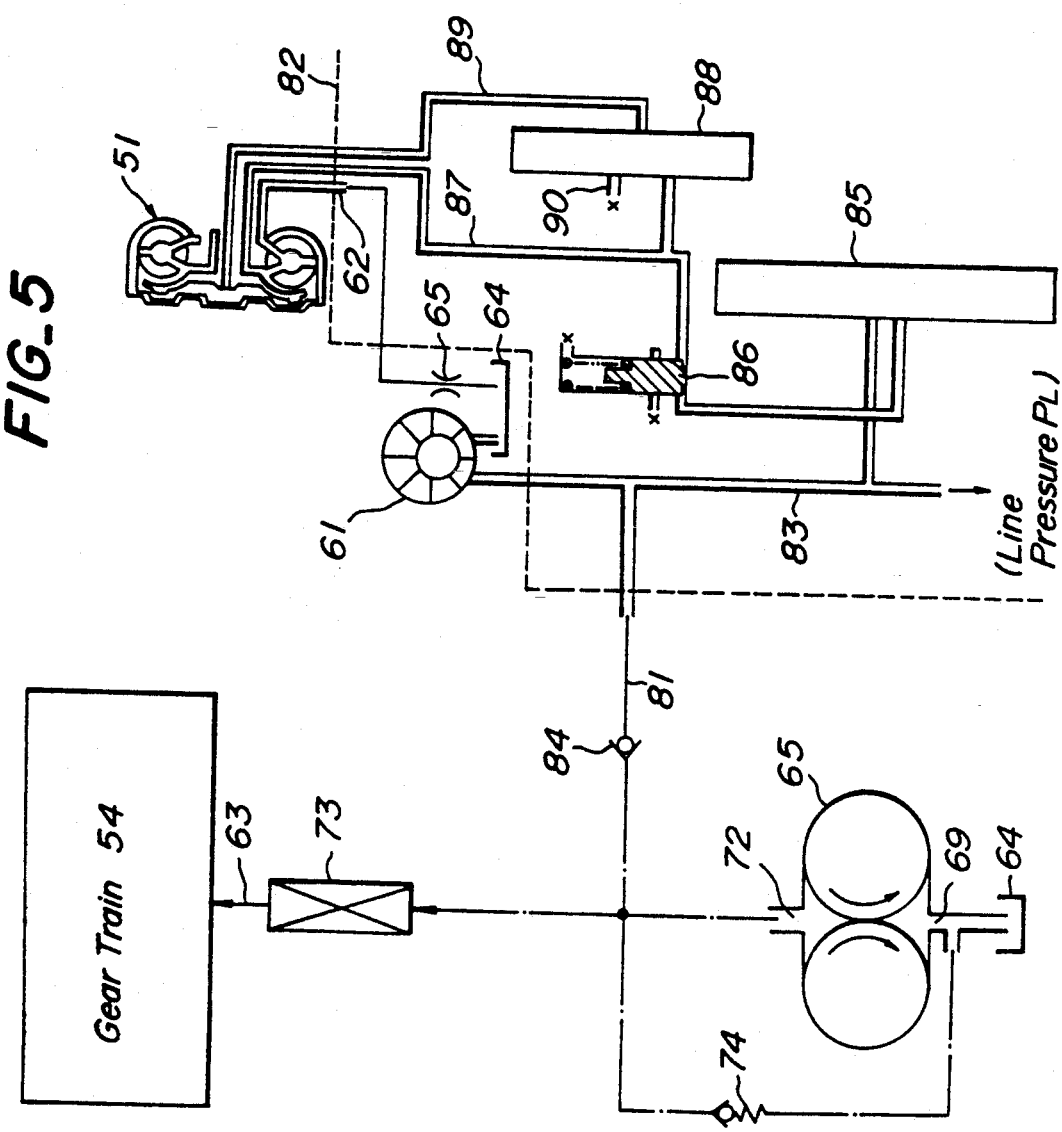
FIG_5

PRESSURIZED FLUID SUPPLY SYSTEM FOR AUTOMATIC POWER TRANSMISSION FOR AUTOMOTIVE VEHICLE

BACKGROUND OF THE INVENTION

1. Field of the Invention

This invention relates generally to a hydraulic system for an automatic power transmission for an automotive vehicle; in particular, it pertains to a system for circulating pressurized fluid through hydraulic circuits of an automatic power transmission in order to control operation of the transmission and associated components and to lubricate various components therein.

More specifically, the invention relates to a pressurized working fluid supply system for hydraulic circuits, which incorporates two mutually distinct fluid pressure source units for independent supply of working fluid for controlling transmission operation, on one hand, and for lubricating constituent elements of the automatic power transmission, on the other hand.

2. Description of the Related Art

Hydraulic systems for various automotive automatic power transmissions, inclusive of a continuously variable transmission, generally include lubrication circuits for supplying working fluid to various transmission components for their lubrication and to hydraulic control circuits for supplying control pressure to various transmission components in order to control transmission speed ratio, shift timing, operational state of lock-up clutches incorporated in a torque converter, etc. One typical construction of such hydraulic systems is disclosed in "Service Manual for RE4R01A-type Automatic Transmission" issued by Nissan Motor Co., Ltd, the assignee of the entire interests and title relative to the present invention. The lubrication circuit and the hydraulic control circuit disclosed in this publication are formed as a series circuit which receives pressurized working fluid from a common fluid pump.

It is well known in the art that the lubrication circuit requires working fluid at relatively low pressure and relatively high flow rate, whereas the hydraulic control circuit requires working fluid at relatively high pressure and relatively low flow rate. Due to the contradictory requirements in the lubrication circuit and the hydraulic control circuit, the conventional hydraulic system with the common fluid pump does not always achieve an optimum fluid supply efficiency. It has therefore been a common or typical practice of fluid supply for the lubrication circuit and the hydraulic control circuit in the prior art, to generate with the fluid pump a high pressure working fluid at a pressure level which is high enough for establishing the required line pressure level in the hydraulic control circuit, and to lower the pressure level of the supplied working fluid for obtaining the working fluid at the relatively low pressure and relatively high fluid flow rate which are required for the lubricating circuit. Therefore, it can be readily appreciated that the above-mentioned measure is disadvantageous in that an improved fluid pump operation efficiency cannot be achieved due to the necessity of lowering the pressure to satisfy the requirement for the lubrication circuit. This results in degradation of the operation efficiency of the entire hydraulic circuit.

In the prior art, there have been some proposals to use a dual pump system in the hydraulic systems of the automatic transmissions. For example, "Service Manual for W4A040-type Automatic Transmission" issued by Daimlar Benz A. G., discloses such a dual pump system in hydraulic circuit for an automatic transmission. In the dual pump system disclosed in this publication, an auxiliary fluid pump is associated with output shaft of the transmission so that it can be driven by the output torque of the output shaft. However, the auxiliary fluid pump in the disclosed system is provided merely to achieve a fail-safe function in the event that the primary fluid pump fails and becomes inoperative or lowers the discharge pressure. Therefore, even with the dual fluid pump system in the aforementioned prior art, it is still difficult, if not impossible, to optimize the operation efficiency of the fluid pump and the operation efficiency of the hydraulic system.

SUMMARY OF THE INVENTION

With the above-mentioned drawbacks of the prior art in view, it is a primary object of the present invention to provide a hydraulic system for an automatic transmission, which is capable of optimizing efficiency of pressure supply for both hydraulic control circuit and lubrication circuit, by employing an improved dual fluid pump system having independent fluid source units respectively for the hydraulic control circuit and for the lubrication circuit.

Briefly stated, according to the invention, there is provided a hydraulic system for an automatic transmission, which is provided with a lubrication circuit for lubricating transmission components and also with a hydraulic control circuit fabricated independently of the lubrication circuit, for controlling the operation of the transmission components. The hydraulic system employs a first fluid pump connected to the hydraulic control circuit for supplying working fluid thereto, and a second fluid pump connected to the lubrication circuit for supplying working fluid thereto.

More particularly, according to one aspect of the invention, there is provided a hydraulic system for an automatic power transmission including a torque converter and a transmission mechanism, which comprises: a lubrication circuit for lubricating components of said transmission mechanism; a hydraulic control circuit for controlling operation of the automatic transmission; first pressurized fluid source means for supplying pressurized fluid to the hydraulic control circuit; and second pressurized fluid source means operative independently of the first pressurized fluid source means, for supplying pressurized fluid to the lubrication circuit.

According to another aspect of the invention, there is provided a hydraulic circuit system for an automatic power transmission unit for an automotive vehicle, the automatic power transmission unit incorporating a torque converter, a transmission casing and a power transmission mechanism accommodated within the transmission casing and including gear train shiftable for establishing one of a plurality of transmission speed ratios between input and output shafts of the power transmission mechanism, the hydraulic circuit system comprising: a control circuit for supplying control pressure to the power transmission mechanism in order to establish desired one of the transmission speed ratios; a lubrication circuit for supplying lubricating fluid for lubrication of the gear train, the lubrication circuit being fabricated independently of the control circuit; first pressurized fluid source means mounted on the transmission casing and driven by driving torque transmitted across the automatic transmission, for supplying the control pressure to the control circuit; and second pressurized fluid source means mounted on the transmission casing and driven by driving torque transmitted across the automatic transmission and operable independently of the first fluid source means, for supplying the lubricating fluid for the lubrication circuit.

In the latter case, one of the first and second pressurized fluid source means is preferably coupled with the input shaft to be driven by the input torque transmitted therethrough, with the other of the first and second pressurized fluid source means being coupled with the output shaft to be driven by the output torque transmitted therethrough. According to a practical embodiment, the first and second pressurized fluid source means are connected to a common working fluid reservoir means, and the other of the first and second fluid source means is connected to the common working fluid reservoir means via a pair of paths on of which is adapted to suck the working fluid therein and the other of which is adapted to recirculate part of the working fluid to suction side, the pair of paths being communicated across a valve means for preventing surge flow of working fluid thereacross, and the pair of paths switching functions of sucking and recirculating the working fluid depending upon driving direction of the output shaft. To this end, a preferred embodiment of the hydraulic circuit system further comprises a lubricating fluid supply switching valve disposed between the lubrication circuit and a return path recirculating control pressure past through the control circuit to the working fluid reservoir means, and responsive to pressure level of the lubricating fluid supplied from the second pressurized fluid source means, for blocking fluid communication therebetween while the lubricating fluid pressure level is higher than a predetermined pressure level and establishing fluid communication therebetween while the lubricating fluid pressure level is lower than the predetermined pressure level.

Preferably, the hydraulic circuit system further comprises a fail-safe circuit means for establishing at least one of communication between the first pressurized fluid source means and the lubrication circuit, and between the second pressurized fluid source means and the control circuit, the fail-safe circuit means being normally placed in an inactive state and responsive to failure of one of the first and second pressurized fluid source means for establishing fluid communication between normally operating pressurized fluid source means and one of the lubrication circuit and the control circuit associated with faulty pressurized fluid source means.

The automatic power transmission may be coupled with a differential gear unit for forming an automatic transaxle, with the second pressurized fluid source means comprising an external gear pump formed by an output gear which is driven by the output shaft, and an idler gear which is mounted on a counter shaft of the differential gear unit.

In the preferred construction, the hydraulic circuit system may further comprise flow control means disposed in a fluid path connecting the control circuit and a working fluid source means for recirculating the working fluid from the control circuit to the working fluid source means, wherein the flow control means is adapted to adjust fluid flow rate recirculating to the working fluid source depending upon operational load on the torque converter utilizing working fluid in the fluid source means for operation. In such case, the flow control means may include means for adjusting fluid recirculation rate by detecting operational load of the torque converter. Preferably, the adjusting means is adapted to detect fluid temperature as a parameter representative of the operational load on the torque converter.

According to a further aspect of the invention, there is provided a hydraulic system for an automatic power transmission with a torque converter, which comprises: first circuit means connected to a first load for supplying first fluid pressure to the first load so that the first load performs a predetermined first function for the automatic power transmission; second circuit means fabricated independently of the first circuit and connected to a second load of the automatic power transmission, the second circuit means supplying second fluid pressure to the second load so that the second load performs a predetermined second circuit function for the automatic power transmission; first pressurized fluid source means provided for supplying pressurized fluid to the first circuit means; and second pressurized fluid source means operative independently of the first pressurized fluid source, for supplying pressurized fluid to the second circuit means.

According to a still further aspect of the invention, there is provided a hydraulic system for an automatic power transmission with a torque converter, which comprises: first circuit means connected to a first load for supplying first fluid pressure to the first load so that the first load performs a predetermined first function for the automatic power transmission; second circuit means connected to a second load of the automatic power transmission, the second circuit means supplying second fluid pressure to the second load so that the second load performs a predetermined second function for the automatic power transmission; first pressurized fluid source means provided for supplying pressurized fluid to the first circuit means; second pressurized fluid source means operative independently of the first pressurized fluid source, for supplying pressurized fluid to the second circuit means, the second pressurized fluid source means being operative in a first mode for supplying fluid pressure in a first direction, and a second mode for supplying fluid pressure in a second direction opposite to the first direction or for stopping supply of fluid pressure; and means responsive to the second pressurized fluid source means operating in the first mode, for blocking fluid communication between the first and second circuit means so that pressurized fluid is supplied to the second circuit from the second pressurized fluid source means, and responsive to the second pressurized fluid source means operating in the second mode, for establishing fluid communication between the first circuit means and the second circuit means in order to supply fluid pressure in the first circuit means to the second circuit mans.

BRIEF DESCRIPTION OF THE DRAWINGS

FIGS. 4A and 4B are respectively sectional view and end view showing an automatic transmission which incorporates a further embodiment of the hydraulic circuit according to the present invention; and FIGS. 5 and 6 are respectively schematic diagrams showing still further embodiments of the hydraulic circuit for the automatic transmission according to the invention.

DETAILED DESCRIPTION OF THE PREFERRED EMBODIMENTS

The present invention will now be more fully explained with reference to some preferred embodiments shown in the accompanying drawings.

Figure 1:
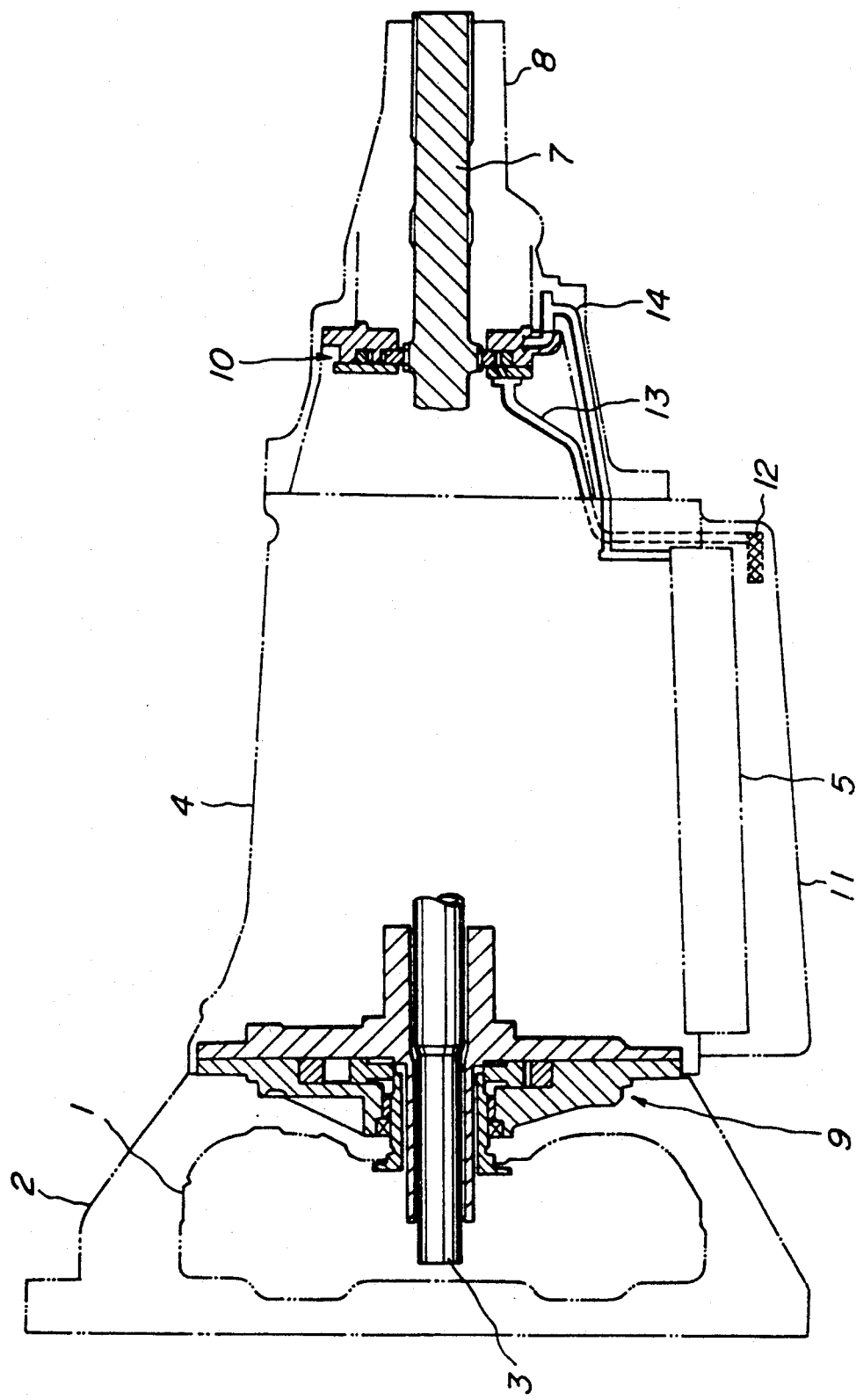
FIG. 1 is a schematic sectional view showing one example of an automatic transmission to which the hydraulic system according to the present invention can be applied.
Figure 2:
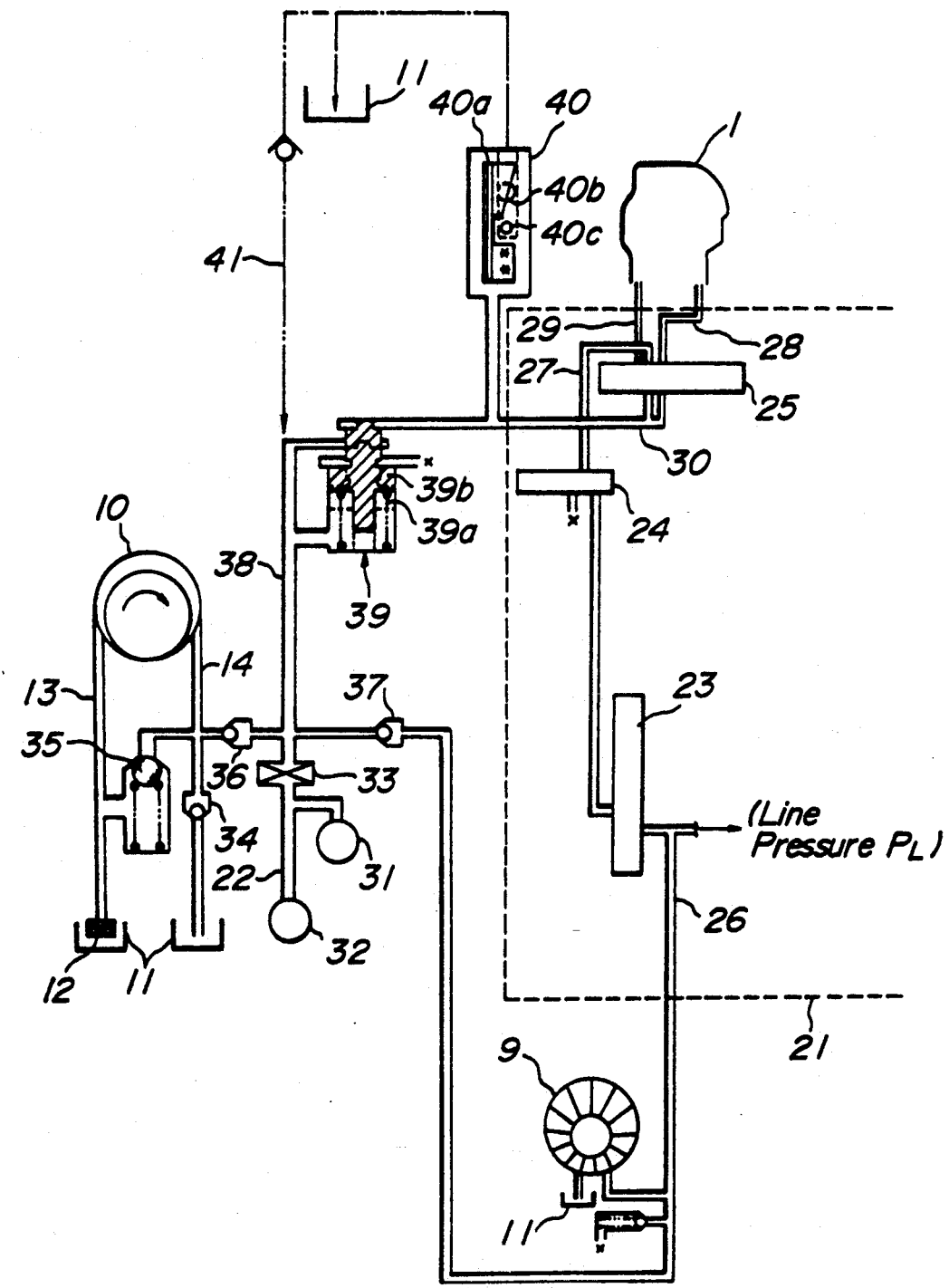
FIG. 2 is a schematic diagram showing one preferred embodiment of the hydraulic system of FIG. 1.

There is shown in FIGS. 1 and 2 an automatic transmission which is more fully disclosed in the aforementioned "Service Manual for RE4R01A-type Automatic Transmission", and to which the hydraulic system according to the invention can be conveniently applied. The entire disclosure of this publication is incorporated herein by reference, for the sake of disclosure.

The automatic transmission illustrated in FIGS. 1 and 2 includes a torque converter 1 with a converter housing 2. The torque converter 1 is connected to an output shaft, i.e. crankshaft, of an internal combustion engine (not shown) to receive therethrough an engine output torque. The torque converter 1 is also connected to an input shaft 3 of a power transmission mechanism (not shown) accommodated within a transmission casing 4, so as to transfer output torque of the torque converter 1 to the power transmission mechanism. The power transmission mechanism includes one or more gear trains and friction elements for establishing a plurality of transmission speed ratios. In order to select a desired transmission speed ratio, the power transmission mechanism is subjected to a hydraulic pressure control by means of a hydraulic control circuit accommodated within a valve body 5 which is fixed onto the transmission casing 4. The power transmission mechanism serves to transmit an output torque to a final drive (not shown) via an output shaft 7 which extends through a rear extension 8 of the transmission casing 4.

An oil pump 9 is disposed between the converter housing 2 and the transmission casing 4 in a manner known, per se. The oil pump 9 serves as a pressure source for a hydraulic control circuit 21 (FIG. 2) fabricated within the valve body 5, and will be hereinafter referred to as "first oil pump". The first oil pump 9 is associated with the input shaft 3 so that it can be driven by the input torque of the power transmission mechanism, which is transmitted from the torque converter 1. There is further provided a separate oil pump 10 within the rear extension 8. This pump 10 serves as a pressure source for a lubrication circuit, and will be hereinafter referred to as "second oil pump". The second oil pump 10 is associated with the output shaft 7 so that it can be driven by the output torque of the transmission mechanism, which is transmitted through the output shaft 7.

The first oil pump 9 is adapted to suck working fluid in an oil pan 11, for supplying pressurized working fluid to the above-mentioned control circuit within the valve body 5, which is denoted by reference numeral 21. The second oil pump 10, in turn, is adapted to suck working fluid in the oil pan 11 via a strainer 12 and a suction path 13, and to discharge pressurized fluid to a discharge path 14 connected to the above-mentioned lubrication circuit which is denoted by reference numeral 22 and which serves to supply lubricating working fluid to the power transmission mechanism in the transmission casing 4 via a fluid path extending through the valve body 5.

The hydraulic control circuit 21 and the lubrication circuit 22 illustrated in FIG. 2 may be identical to those disclosed in the aforementioned "Service Manual for RE4R01A-type Automatic Transmission". While the circuit construction has been specified in the illustrated embodiment, by way of example only, the present invention is applicable to any type of hydraulic circuits of the automatic transmission. Since the construction of the hydraulic circuit, per se, is not essential to the present invention, valves and associated portions of the fluid paths in the hydraulic circuit 21 will be explained below only briefly, with reference to FIG. 2.

The hydraulic circuit 21 includes a pressure regulator valve 23, a torque converter relief valve 24 and a lock-up control valve 25. The pressure regulator valve 23 serves to regulate source pressure supplied from the first oil pump 9 to establish a predetermined pressure level of line pressure PL to be supplied to a line pressure circuit 26. The line pressure circuit 26 forms part of the hydraulic control circuit 21, so that the line pressure PL thus generated is used to control the operational states of the friction elements and to thereby establish the desired transmission speed ratio. The pressure regulator valve 23 serves to feed excessive working fluid to the torque converter relief valve 24. The torque converter relief valve 24 serves to modulate a predetermined pressure level of converter pressure. The converter pressure thus modulated is supplied to a working fluid supply circuit 27 of the torque converter 1. The lock-up control valve 25 serves to control the operational state of a lock-up clutch in the torque converter, for adjusting slippage at the lock-up clutch and establishing or releasing lock-up state of the torque converter. To this end, the lock-up control valve 25 serves to supply the converter pressure to an apply chamber via an apply line 28 of the working fluid supply circuit, and to drain fluid pressure in a release chamber via a release line 29 and a fluid return circuit 30, for engaging the lock-up clutch and thereby establishing a lock-up mode. The lock-up control valve 25 further serves to supply the converter pressure to the release chamber via the release line 29, and to drain the fluid pressure in the apply chamber via the apply line 28 and the fluid return circuit 30, for disengaging the clock-up clutch and causing the torque converter to operate in a torque conversion mode.

On the other hand, the lubrication circuit 22 serves to supply the lubricating working fluid to a front lubricating section 31 and a rear lubricating section 32 of the power transmission mechanism, each requiring an appropriate lubrication. The lubrication circuit 22 includes an oil cooler 33 arranged on the upstream side of the front and rear lubricating sections 31, 32. The construction of the lubrication circuit 22 is essentially identical to that illustrated in the aforementioned "Service Manual for RE4R01A-type Automatic Transmission". Hence, a detailed construction of the lubrication circuit 22 for the front and rear lubricating sections 31, 32 on the downstream side of the oil cooler 33 has been omitted from FIG. 2. In the illustrated embodiment, a one-way check valve 34 is disposed in the discharge path 14 for permitting flow of working fluid directed from the oil pan 11 to the second oil pump via the discharge path 14 and prohibiting fluid flow in reverse direction. The one-way check valve 34 of the discharge path 14 on its upstream side is connected to the suction path 13 via a pressure relief valve 35, and also to an inlet port of the oil cooler 33 via another one-way check valve 36.

Furthermore, as shown in FIG. 2, the inlet port of the oil cooler 33 is connected to the line pressure circuit 26 via still another one-way check valve 37, and also to a lubrication switching circuit 39 via a fluid path 38. When the fluid pressure in the fluid path 38 is at a level higher than a predetermined pressure, this fluid pressure cooperates with a spring 39a to maintain a valve body 39b of the lubrication switching valve 39 at a position illustrated by solid line. On the other hand, the lubrication switching valve 39 is responsive to the fluid pressure drop in the fluid path 38 below the predetermined pressure, to displace the valve body 39b at a position illustrated by imaginary line and thereby establish a fluid communication between the fluid return path 30 and the fluid path 38. Thus, the The spring 39a has a spring constant of such a magnitude that the spring force cooperating with the fluid pressure introduced through the fluid path 38 overcomes the fluid pressure introduced into another chamber via the fluid return path 30 to maintain the valve body 39b of the lubrication switching valve 39 at the position illustrated by the solid line, while the fluid pressure supplied to the inlet port of the oil cooler 33 is maintained higher than the predetermined level required for satisfactorily lubricating the gear train. At this position, the valve body 39b blocks fluid communication between the fluid return path 30 and the fluid path 38. On the other hand, when the transmission operates in parking or neutral range for maintaining the output shaft at a rest position and thus maintaining the output gear inoperative, or when the transmission operates in reverse range for driving the output shaft and the output gear in reverse direction, the fluid pressure supplied to the inlet port of the oil cooler 33 from the second oil pump 10 becomes zero or negative. On this occasion, the fluid pressure in the fluid return path 30 overcomes the composite force of the spring and the fluid pressure from the fluid path 38, to place the valve body 39b in a position illustrated by the imaginary line. This valve position allows fluid communication between the fluid return path 30 and the fluid path 38 to be established, so that the fluid flowing through the fluid return path 30 is supplied to the inlet port of the oil cooler 33 of the lubrication circuit 22.

The fluid return path 30 is further connected to the oil pan 11 via a temperature-responsive orifice 40. The temperature-responsive orifice 40 includes a bimetal element 40a which is responsive to the working fluid temperature. The bimetal element 40a serves to adjust the opening degree of a port 40b so that the flow passage area at the port 40b is increased according to increase in the working fluid temperature for adjusting the flow rate of the fluid returning to the oil pan 11. The temperature-responsive orifice 40 is formed with a through opening 40c which defines a minimum fluid flow area so that the working fluid of minimum flow rate may flow therethrough even when the port 40b is fully closed.

The outlet port of the temperature-responsive orifice 40 may directly connected to the oil pan 11, as shown by dotted line. Alternatively, it is possible to connect the outlet port of the temperature-responsive orifice 40 to the fluid path 38 and eventually to the lubricating circuit 22 via a fluid path 41 including a one-way check valve, as shown by two-dotted line.

In operation of the hydraulic system of the aforementioned construction, the hydraulic control circuit 21 performs shift control for establishing a desired transmission speed ratio and achieving a pressure control for suppressing shift shock with the pressure PL which is obtained by regulating the source pressure of the first oil pump 9 by means of pressure regulator valve 23 and supplied through the line pressure circuit 26. At the same time, lock-up control is performed for the torque converter 1 by the lock-up control valve 25.

On the other hand, the lubrication circuit 22 receives the lubricating fluid discharged from the second oil pump 10 which is driven by the output shaft 7 of the automatic transmission. The pressure of the lubricating fluid flowing through the discharge path 14 is regulated by the pressure relief valve 35, and is supplied to the oil cooler 33 via the one-way check valve 36. The oil cooler 33 cools the lubricating fluid and then supplies to the front and rear lubricating sections 31 and 32 for lubrication through the lubrication circuit 22. While the discharge pressure of the second oil pump 10 is supplied to the discharge path 14, the valve body 39b of the lubrication switching valve 39 is maintained at the position illustrated by the solid line. Therefore, fluid communication between the fluid return path 30 and the fluid path 38 is blocked, and the working fluid flowing through the fluid return path 30 is returned to the oil pan 11 only though the temperature-responsive valve 40. The working fluid flowing though the temperature-responsive valve 40 is then fed either to the oil pan 11 directly or, in the alternative, to the oil pan via the fluid path 41, the coil cooler 33 and the front and rear lubricating sections 31 and 32.

In the illustrated construction, the temperature-responsive orifice 40 varies the fluid flow passage area for adjusting the fluid flow rate depending upon the temperature of the working fluid flowing therethrough. Since the fluid flow passage are in the temperature-responsive orifice 40 is increased according to increase in the working fluid temperature, it is possible to effectively prevent undesirable over-heating of the working fluid, particularly at a high load condition of the torque converter.

It can be readily appreciated that the illustrated embodiment of the hydraulic system employs the first and second oil pumps 9 and 10 for supplying pressurized fluid to the hydraulic control circuit 2 and the lubrication circuit 22 independently of each other, so that it is possible to adapt the discharge characteristics of the respective pumps to the requirement of the associated circuits, thereby to optimize the respective operation efficiencies of the individual pumps. In addition, the working fluid amount circulating to the torque converter can be adjusted by the temperature-responsive orifice 40 depending upon the working fluid temperature. Since the working fluid temperature varies substantially according to variation of load at the torque converter, circulating amount of the working fluid in the torque converter will not become excessive even at low load condition. Namely, when the load on the torque converter 1 is relatively low, the working fluid temperature should not be so high, so that the fluid passage area in the temperature-responsive orifice 40 may be limited to effectively prevent circulation of excessive amount of working fluid in the torque converter 1. Furthermore, due to the fluid flow rate control by mean of the temperature-responsive orifice 40, it is possible to prevent unnecessary consumption of pressure supplied from the first oil pump 9, and minimize energy loss at the first oil pump and optimize the operation efficiency thereof.

In the embodiment shown in FIGS. 1 and 2, when the selected operational mode of the automatic transmission is parking or neutral range in which the output shaft 7 is disconnected from the input shaft and thus maintained at the rest condition, or when the selected operational mode of the automatic transmission is reverse range in which the rotational direction of the output shaft 7 is reversed from that during forward driving ranges, the second oil pump 10 is placed inoperative or driven in reverse direction. In such case, the fluid pressure in the discharge path 14 becomes zero or negative so that no working fluid is supplied to the fluid path 38 from the second oil pump 10. In response to this, the lubrication switching valve 39 shifts the valve body 39b from the position represented by solid line to the position represented by the imaginary line. By this, fluid communication is established between the fluid return path 30 and the fluid path 38, so that the working fluid in the fluid return path 30 is supplied to the front and rear lubricating sections 31, 32 via the fluid path 38, the discharge path 14 and the coil cooler 33. Therefore, even when the second oil pump 10 is held inoperative or driven in reverse direction, it is still possible to maintain supply of the lubricating fluid for the lubrication circuit 22.

Furthermore, in the embodiment shown in FIGS. 1 and 2, when failure is caused in the first oil pump 9 to become inoperative or to lower discharge pressure thereof, the working fluid supplied from the second oil pump 10 to the oil cooler 33 via the discharge path 14 is admitted to flow into the line pressure circuit 26 via the one-way check valve 37 which is normally maintained in fluid communication blocking position by the line pressure in the line pressure circuit 26 supplied from the first oil pump 9 via the pressure regulator valve 23. Therefore, a fail-safe function can be performed to maintain the power transmission mechanism operative even when failure of the first oil pump is caused during the forward running state of the automotive vehicle.

Figure 3:
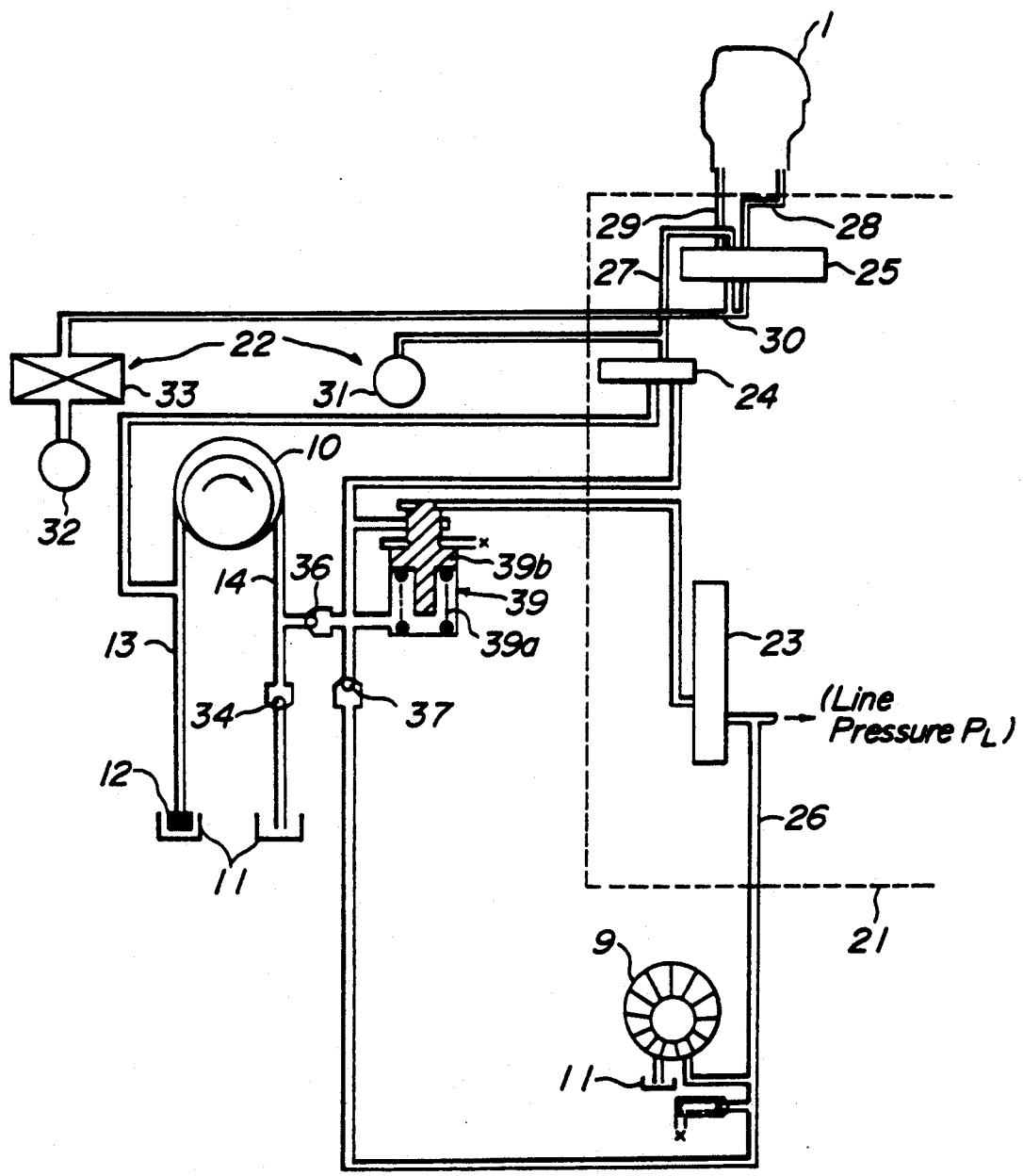
FIG. 3 is a schematic diagram showing another embodiment of the hydraulic system of the present invention.

FIG. 3 shows another embodiment of the hydraulic system for an automatic transmission according to the invention, wherein components which are identical with or functionally equivalent to those in the previous embodiment are denoted by the same reference numerals. Thus, a duplicative description for these components will be omitted in order to simplify the disclosure and facilitate clear understanding of the invention.

In the embodiment shown in FIG. 3, instead of using excess fluid from the pressure regulator valve 23 for normally operating the torque converter 1, the working fluid discharged from the second fluid pump 10 is used in the normal forward driving state of the transmission. While the second fluid pump 10 is inoperative or driven in reverse direction during parking-, neutral- or reverse- range operation of the transmission, the excess fluid from the pressure regulator valve 23 is used as the working fluid for the torque converter 1. To this end, the switching valve 39 is connected to establish fluid communication between the torque converter relief valve 24 and selected one of the pressure regulator valve 23 and the discharge path 14 through which the working fluid discharged from the second fluid pump 10 circulates.

More particularly, when the second fluid pump 10 is operative and driven in normal direction, the fluid pressure in the discharge path 14 is maintained higher than or equal to a predetermined pressure so that the switching valve 39 establishes fluid communication between the discharge path 14 and the torque converter relief valve 24. On the other hand, when the second fluid pump 10 is inoperative or driven in reverse direction, the fluid pressure in the discharge path 14 is maintained lower than the predetermined pressure, so that the switching valve 39 establishes fluid communication between the pressure regulator valve 23 and the torque converter relief valve 24 for circulating the the excess fluid circulated from the pressure regulator valve to the torque converter relief valve.

The embodiment shown in FIG. 3 is to use part of the working fluid supplied from the torque converter relief valve 24 to the working fluid supply circuit 27 for lubricating the front lubricating section 31, and is also to use part of the working fluid supplied to the fluid return path 30 from the lock-up control valve 25 for lubricating the rear lubricating section 32.

The arrangement shown in FIG. 3 does not require provision of the relief valve 35 and the temperature-responsive orifice 40 as in the previous embodiment. Therefore, the hydraulic system according to the illustrated embodiment can be made more simple in construction and less expensive in production cost than that in the previous embodiment. The arrangement shown in FIG. 3 is further advantageous in that it does not require modification to existing connection of the lubrication circuit 22 to the control circuit 21 in conventional automatic transmission. This means that characteristics of lubricating fluid demand can be maintained unchanged, effectively avoiding adverse influences to the front and rear lubricating sections 31 and 32.

Figure 4B:
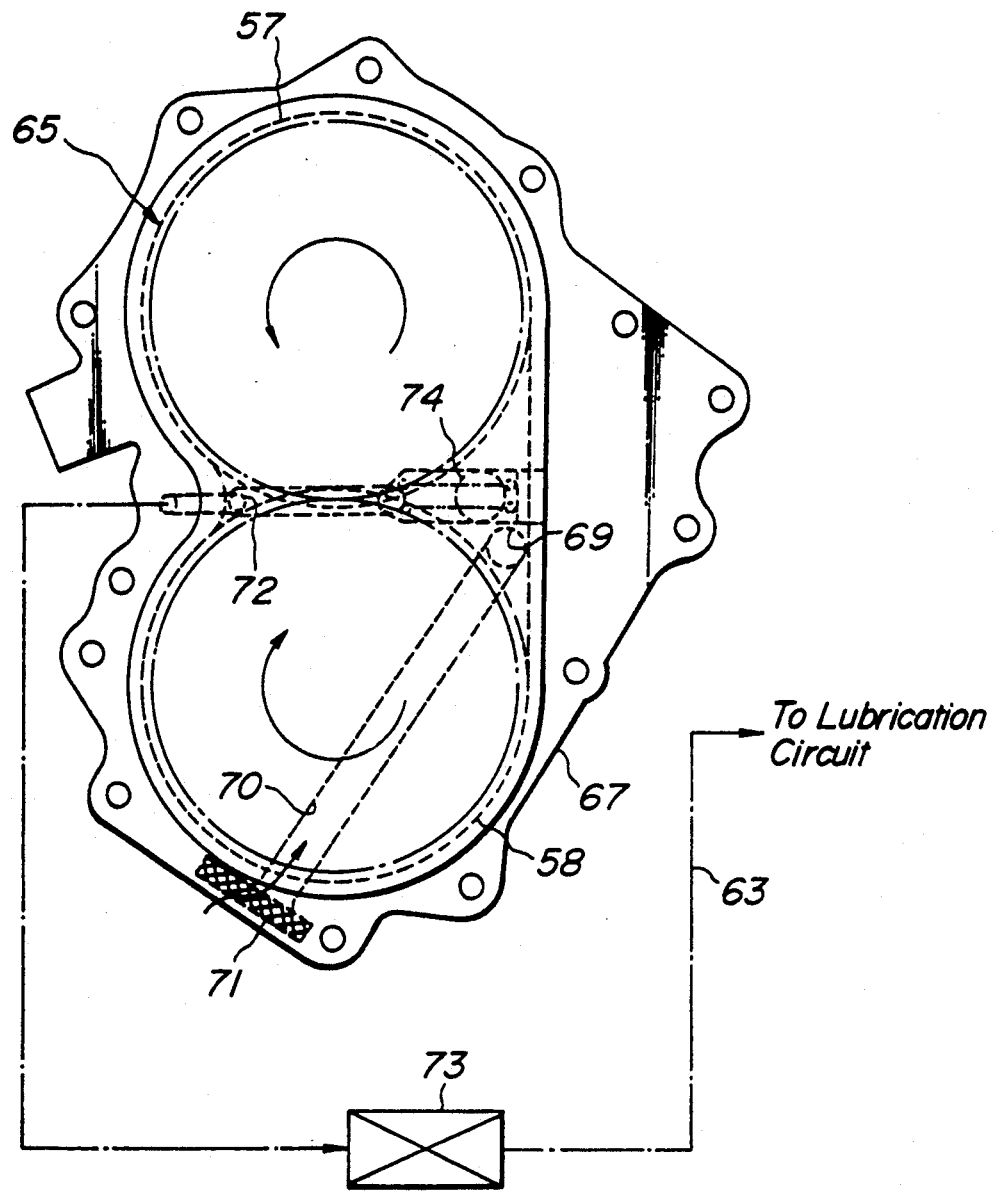

There is shown in FIGS. 4A and 4B one example of application to an automatic transaxle, of the hydraulic system according to the present invention. The automatic transaxle may be one which is disclosed in "Service Manual for RL4F02A-type Automatic Transaxle", issued by Nissan Motor Co., Ltd., the entire disclosure of which is incorporated herein by reference, for the sake of disclosure.

The illustrated automatic transaxle includes, as shown in FIGS. 4A, a torque converter 51 which is accommodated within a converter housing 52, and driven by the output torque of an internal combustion engine (not shown) for transmitting the driving torque to a power transmission mechanism via an input shaft 53, as in the previous embodiments The power transmission mechanism includes a gear train 54 which selectively establishes power transmission path with a desired combination of gears to thereby transmit the driving torque input from the input shaft 53 at a desired transmission speed ratio. In order to selectively establish power transmission path in the gear train 54, a hydraulic control circuit is provided in a valve body 55 which is mounted on a transmission casing 66. An output shaft 56 is connected to the gear train 54 to be driven by the transmitted driving torque at a rotational speed in a desired speed ratio relative to the rotational speed of the input shaft 53. An output gear 57 is rigidly mounted on the output shaft 56 for rotation therewith, and is meshed with an idler gear 58 which is mounted on a counter shaft 59. The counter shaft 59 is connected to a differential gear assembly 60 for delivery of driving torque to driving wheels.

The embodiment shown in FIGS. 4A and 4B is featured by an arrangement wherein an oil pump 61, which is disposed between the torque converter 51 and the transmission casing 66 in a conventionally manner, is used as the first oil pump for supplying pressurized fluid for the hydraulic control circuit. The working fluid flowing through a fluid return path 62 is directly returned to an oil pan 64 via a flow control orifice 62a. Therefore, this embodiment is differentiated from conventional hydraulic circuit in that the working fluid flowing through the fluid return path 62 is not circulated to a lubrication circuit 63.

The lubrication circuit 63 in the illustrated embodiment is connected to a second oil pump 65 which serves as a lubricating fluid source. As particularly shown in FIG. 4B, the second oil pump 65 may be in the form of an external gear pump which is composed of the output gear 57 and the idler gear 58. For forming the external gear pump as the second oil pump 65, there is provided a side plate 68 between the transmission casing 66 and a side cover 67, such that the side plate 68 cooperates with the side cover 67 to tightly enclose the output gear 57 and the idler gear 58 on outer periphery and both sides thereof.

The second oil pump 65 thus constructed includes an inlet port 69 which is connected to the oil pan 64 via a suction path 70 and an oil strainer 71, as well as a discharge port 72 which is connected to inlet port of an oil cooler 73 in the lubrication circuit 63. A pressure relief valve 74 is provided between the discharge port 72 and the inlet port 69, and serves to recirculate excess fluid directly to the inlet port. Therefore, the fluid pressure supplied to the inlet port of the oil cooler 73 from the discharge port 72 can be maintained at a pressure level lower than or equal to a predetermined value.

As shown in FIG. 4A, shims 75, 76 are arranged respectively opposing to bearings for the output shaft 56 and the counter shaft 59. Together with these shims 75, 76, the side plate 68 serves to adjust side clearance of the output gear 57 and the idler gear 58. Namely, by adjusting the thickness of each shim 75, 76, the output gear 57 and the idler gear 58 can be precisely aligned with each other on a common plane to form substantially flush side surface. Therefore, by appropriately adjusting the thickness of the side plate 68, the side clearance between the mating surfaces of the side plate 68, on one hand, and the output gear 57 and the idler gear 58, on the other hand, can be appropriately adjusted t minimize leakage of the working fluid. This serves to improve the operation efficiency of the second oil pump 65. Furthermore, by appropriately adjusting the side clearance, friction between the mating surfaces of the side plate 68, the output gear 57 and the idler gear 58 can be reduced to minimize pump driving loss and avoid possibility of seizure.

Similarly to the foregoing first embodiment, the first oil pump 61 for supplying fluid pressure to the hydraulic control circuit and the second oil pump 65 for supplying lubricating fluid are provided independently of the other. Therefore, the discharge characteristics of respective oil pumps 61 and 65 can be adapted to satisfy requirements of the associated circuits, thereby significantly improving operation efficiency of the hydraulic system. In addition, according to the illustrated embodiment, the second oil pump 65 in the form of an external gear pump is formed by utilizing existing output gear 57 and the idler gear 58 which are indispensable components for performing power transmission. Thus, addition of the second oil pump function neither results in complexity in the construction of the automatic transaxle, nor requires extra space. Furthermore, due to the provision of the second oil pump 65 for supplying the lubricating fluid to the lubrication circuit 63, the discharge rate for the first oil pump 61 becomes significantly smaller as compared with that required in the prior art. Therefore, the first oil pump 61 can be formed with smaller displacement and thus in smaller size, allowing reduction in size of the entire automatic transmission.

FIG. 5 shows a hydraulic system according to a still further embodiment which is similar to that illustrated in FIG. 4, but which is differentiated therefrom in that a fail-safe path 81 is provided. The fail-safe path 81 is communicated with the discharge port 72 of the second oil pump 65, the discharge port of the first oil pump 61 and a line pressure circuit 83. A one-way check valve 84 is provided in the fail-safe path 81 for normally blocking fluid flow from the line pressure circuit 83 to the lubrication circuit 63.

The hydraulic control circuit 82 in the embodiment shown in FIG. 5 is generally of a construction as disclosed in the aforementioned "Service Manual for RL4F02A-type Automatic Transaxle", which provides full disclosure for understanding the construction and operation of the hydraulic control circuit 82, so that explanation will be made hereinafter only briefly with respect to components which are relevant to the present invention.

The first oil pump 61 serves to supply the pressurized fluid to the line pressure circuit 83 via a pressure regulator valve 85 which is adapted to regulate the source pressure supplied from the first oil pump 61 by draining excess fluid in a manner known, per se. The pressure regulator valve 85 thus generates a predetermined pressure level of the line pressure PL, which is used for shifting control to establish desired transmission speed ratio. The excess fluid is fed from the pressure regulator valve 85 to a torque converter regulator valve 86 which is adapted to regulate the fluid pressure to be supplied to the torque converter 51 to a predetermined pressure level. The torque converter regulator valve 86 feeds the regulated pressure to the torque converter 51 via a working fluid supply path 87. The working fluid drained from the torque converter 51 flows through the fluid return path 62 and returned to the oil pan 64 via the flow control orifice 65. A lock-up control valve 88 is adapted to operate in a manner similar to that disclosed in terms of FIGS. 1 and 2 for controlling the magnitude of slippage in a lock-up clutch (not shown). Thus, the lock-up control valve 88 serves to selectively supply fluid pressure to an apply chamber or release chamber for adjusting the magnitude of slippage in the lock-up clutch thereby to switch the operational mode of the torque converter between torque conversion mode and lock-up mode. For the purpose of illustration, in the construction of FIG. 5, the lock-up control valve 88 establishes fluid communication between the lock-up control path 89 and selected one of the working fluid supply line 87 and a drain line 90.

In the illustrated arrangement, the torque converter 51 operates in torque conversion mode when the lock-up control path 89 is communicated with the working fluid supply path 87, and operates in the lock-up mode when the lock-up control path 89 is communicated with the drain line 90.

When the first oil pump 61 operates normally and the line pressure PL supplied through the pressure regulator valve 85 is maintained at a normal level, the working fluid supplied from the second oil pump 65 is supplied only to the lubrication circuit 63 for lubricating the gear train 54. Therefore, pressurized fluid for the hydraulic control circuit 82 and the lubricating fluid for the lubrication circuit 83 are independently supplied from the first and second oil pumps 61 and 65, respectively.

Namely, in the normal state of operation of the first oil pump 61, the operation of the hydraulic system of FIG. 5 is substantially identical to that performed by the system of FIG. 4. On the other hand, when failure is caused in the first oil pump 61, the line pressure PL supplied from the pressure regulator valve 85 drops below the predetermined value. Thus, as the line pressure PL in the line pressure circuit 83 becomes lower than the fluid pressure supplied from the second oil pump 65, the one-way check valve 84 opens to establish communication between the second oil pump 65 and the line pressure circuit 83 via the fail-safe path 81. Therefore, the predetermined level of the line pressure PL can be generated by the pressure regulator valve 85 for maintaining capability of shift control operation.

Figure 6:
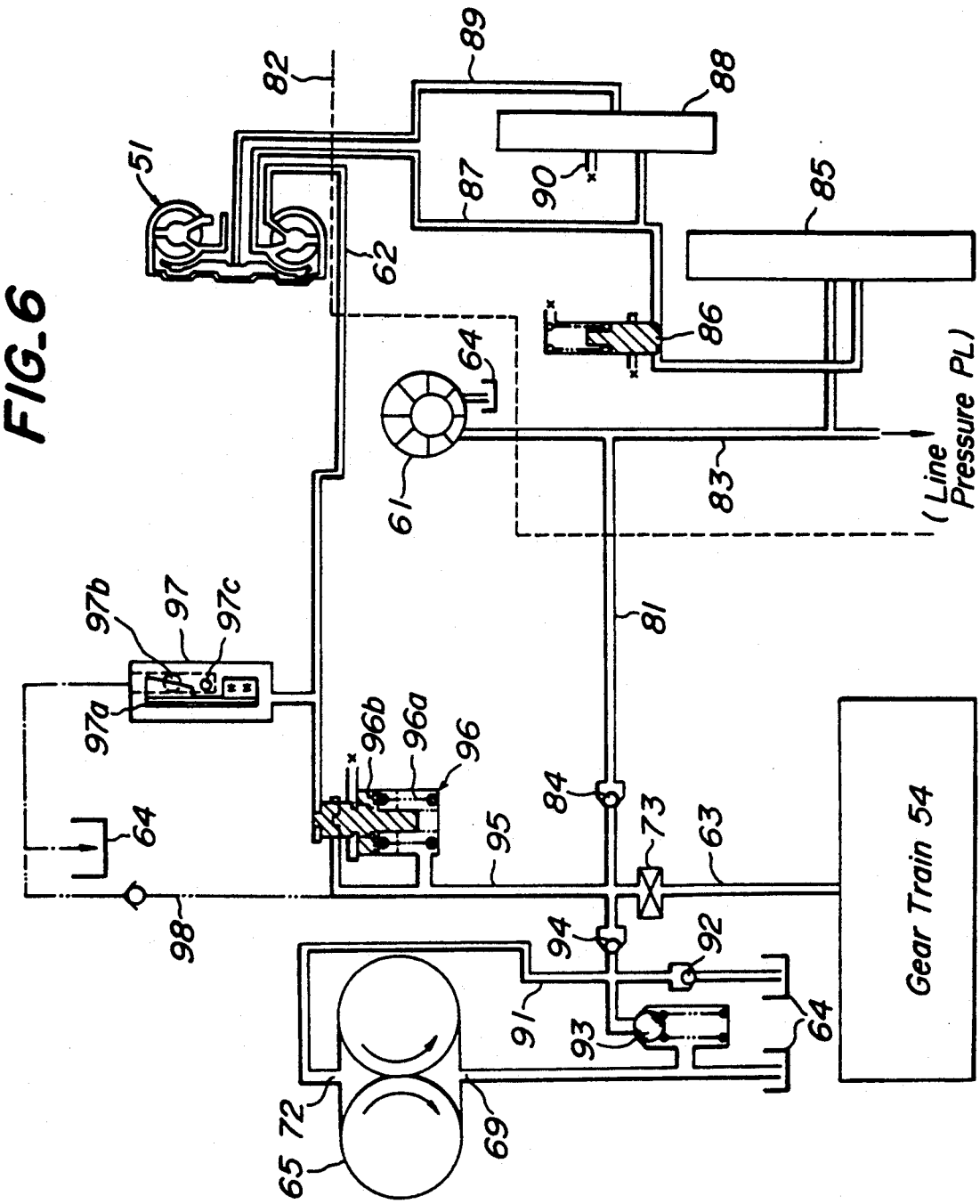

FIG. 6 shows a schematic diagram of a still further embodiment of the hydraulic system which is derived by modifying the hydraulic system of FIG. 5 to incorporate the construction of the lubricating fluid supply system of FIG. 2. It should be noted, however, that this embodiment employs the second oil pump 65 of FIGS. 4A and 4B or FIG. 5 in place of the second oil pump 10 of FIG. 2. The discharge port 72 of the second oil pump 65 is connected to the oil pan 64 via a discharge path 91. A one-way check valve 92 is disposed in the discharge path 91 for blocking fluid flow directed from the second oil pump 65 to the oil pan 64, while permitting fluid flow in the reverse direction. A pressure relief valve 93 is provided for establishing communication between the upstream side of the one-way check valve 92 and the inlet port 69 of the second oil pump 65. The lubrication circuit 63 is connected to the discharge path 91 via another one-way check valve 94. Therefore, the lubricating fluid supplied from the second oil pump 65 is supplied to the inlet port of the oil cooler 73 in the lubrication circuit 63, and then to the lubricating section of the gear train 54 via the oil cooler 73. The fail-safe path 81 is provided to connect the line pressure circuit 83 of the hydraulic control circuit 82 with the discharge path 91 via the one-way check valve 94 and another one-way check valve 84 for the fail-safe function as set forth in connection with the embodiment of FIG. 5.

Similarly to the circuit arrangement of FIG. 2, a lubrication switching valve 96 is connected to the inlet port of the oil cooler 73 via a fluid path 95. As discussed in connection with the lubrication switching valve 39 of FIG. 2, the lubrication switching valve 96 in this embodiment has a spring 96a arranged in one chamber which is supplied with the fluid pressure to the inlet port of the oil cooler 73, through the fluid path 95. The lubrication switching valve 96 has another chamber supplied with the fluid pressure in the fluid return path 62 which serves to connect the torque converter to the oil pan 64 via a temperature-responsive orifice 97. This temperature-responsive orifice 97 is identical in construction to the temperature-responsive orifice 40 in the embodiment of FIG. 2. Thus, the spring 96a has a spring constant of such magnitude that the spring force in combination with the fluid pressure introduced through the fluid path 95 overcomes the fluid pressure introduced into another chamber via the fluid return path 62, so as to maintain the valve body 96b of the lubrication switching valve 96 at the position illustrated by the solid line, while the fluid pressure supplied to the inlet port of the oil cooler 73 is maintained higher than the predetermined level required for satisfactorily lubricating the gear train 54. At this position, the valve body 96b blocks fluid communication between the fluid return path 62 and the fluid path 95. On the other hand, when the transmission operates in parking- or neutral-range for maintaining the output shaft at a rest position and thus maintaining the output gear inoperative, or when the transmission operates in reverse-range for driving the output shaft and the output gear in reverse direction, the fluid pressure supplied to the inlet port of the oil cooler 73 from the second oil pump 65 becomes zero or negative. In such case, the fluid pressure in the fluid return path 62 overcomes the composite force of the spring 96 and the fluid pressure from the fluid path 95, and places the valve body 96b in a position illustrated by the two-dotted line. At this valve position, fluid communication between the fluid return path 62 and the fluid path 95 is established, allowing the fluid flowing through the fluid return path 62 to be supplied to the inlet port of the oil cooler 73 of the lubrication circuit 63.

The temperature-responsive orifice 97 is provided in the fluid return line 62 for adjusting amount of working fluid recirculating to the oil pan 64. The temperature-responsive orifice 97 includes a bimetal element 97a which is responsive to the working fluid temperature. The bimetal element 97a serves to adjust the opening degree of port 97b so that the fluid passage area at the port 97b is increased according to increase in the working fluid temperature, thereby to adjust the flow rate of the fluid to be returned to the oil pan 64. The temperature responsive orifice 97 is formed with a through opening 97c which defines a minimum fluid flow area so that minimum flow rate of the working fluid is permitted to flow therethrough even when the port 97b is fully closed. The outlet port of the temperature-responsive orifice 97 may be directly connected to the oil pan 64 as shown by the dotted line or, alternatively, to the fluid path 95 via fluid path 98 with a one-way check valve as shown by the two-dotted line.

In operation of the hydraulic system shown in FIG. 6, the hydraulic control circuit 82 performs shift control for establishing desired transmission speed ratio and pressure control for suppressing shift shock with the line pressure PL which is obtained by regulating the source pressure of the first oil pump 61 by means of the pressure regulator valve 85 and supplied through the line pressure circuit 83. At the same time, lock-up control is performed for the torque converter 51 by the lock-up control valve 88.

On the other hand, the lubrication circuit 63 receives the lubricating fluid discharged from the second oil pump 65 which is driven by the output shaft of the transmission. The pressure of the lubricating fluid flowing through the discharge path 91 is regulated by the pressure relief valve 93, and is supplied to the oil cooler 73 via the one-way check valve 94. The lubricating fluid is cooled by the oil cooler 73, and then supplied to the front and rear lubricating section for lubricating the gear train 54 (FIG. 3). While the discharge pressure of the second oil pump 65 is supplied to the discharge path 91, the valve body 96b of the lubrication switching valve 96 is maintained at the position illustrated by the solid line. Therefore, fluid communication between the fluid return path 62 and the fluid path 95 is blocked. As a result, the working fluid flowing through the fluid return path 62 is returned to the oil pan 64 only though the temperature-responsive valve 97. The working fluid flowing though the temperature-responsive valve 97 is then fed to the oil pan 64 directly, or, in the alternative, to the oil pan via the fluid path 98, the coil cooler 73 and the gear train 54. In the embodiment shown in FIG. 6, furthermore, the temperature-responsive orifice 97 varies the fluid flow passage area for adjusting fluid flow rate depending upon the temperature of the working fluid flowing therethrough. Since the fluid flow passage area in the temperature-responsive orifice 97 is increased in accordance with increase in the working fluid temperature, it is possible to effectively prevent over-heating of the working fluid, particularly at high load condition of the torque converter.

The embodiment shown in FIG. 6 employs the first and second oil pumps 61, 65 for supplying pressurized fluid to the hydraulic control circuit 82 and the lubrication circuit 63 independently of each other, so that the discharge characteristics of the respective pumps 61, 65 can be adapted to the requirements of the associated circuits to optimize the operation efficiencies of the individual pumps. Moreover, the working fluid amount circulating to the torque converter 51 is adjusted by the temperature-responsive orifice 97 depending upon the working fluid temperature. This is particularly advantageous in that, since the working fluid temperature varies essentially according to variation of the load at the torque converter, circulating amount of the working fluid in the torque converter will not become excessive even at low load condition. Namely, when the load on the torque converter is relatively low, the working fluid temperature should not be so high so that the fluid path area in the temperature responsive orifice 97 may be limited to effectively prevent circulation of excess amount of working fluid in the torque converter 51. Furthermore, due to the fluid flow rate control by means of the temperature-responsive orifice 97, it is possible to prevent unnecessary consumption of pressure supplied from the first oil pump 61, so as to minimize energy loss at the first oil pump and maintain the optimum operation efficiency of the first oil pump 61.

In the illustrated embodiment, when the selected operational mode of the automatic transmission is parking- or neutral-range in which the output shaft is disconnected from the input shaft and maintained at rest position, or reverse-range in which the direction of the output shaft is reversed from that during forward driving ranges, the second oil pump 65 is placed inoperative or driven in reversed direction and the fluid pressure in the discharge path 91 becomes zero or negative. Therefore, no working fluid is supplied to the fluid path 95 from the second oil pump 65, so that the lubrication switching valve 97 shifts the valve body 97b to the position represented by the two-dotted line. As a result, fluid communication between the fluid return path 62 and the fluid path 95 is established to supply the working fluid in the fluid return path 62 to the gear train 54 via the fluid path 95, the discharge path 91 and the coil cooler 73. Therefore, even when the second oil pump 65 is held inoperative or driven in reverse direction, it is possible to maintain supply of the lubricating fluid for the lubrication circuit 63.

Furthermore, in the embodiment of FIG. 6, when failure is caused in the first oil pump 61 to lower the discharge pressure or to become inoperative, the working fluid supplied from the second oil pump 65 to the oil cooler 73 via the discharge path 91 is permitted to flow into the line pressure circuit 83 via the fail-safe path 81 and the one-way check valve 84 which is normally maintained in fluid communication blocking position by the line pressure in the line pressure circuit 83 supplied from the first oil pump 61 via the pressure regulator valve 85. Therefore, fail-safe function can be performed to maintain the power transmission mechanism operative even upon failure of the first oil pump 61 in the running state of the vehicle.

It will be readily appreciated from the foregoing detailed description that, according to the present invention, the hydraulic system for an automatic transmission serves to significantly improve the efficiency of pressure supply for both hydraulic control circuit and lubrication circuit, by employing a dual fluid pump system including independent fluid source units respectively for the hydraulic control circuit and the lubrication circuit. Furthermore, when the hydraulic system the according to the present invention incorporates the fail-safe function as discussed with reference to the embodiments shown in FIG. 1, FIG. 2, FIGS. 4A and 4B, FIG. 5 and FIG. 6, it is possible to advantageously maintain the lubricating function and the shift control operation even upon failure of one of two oil pumps. Moreover, provision of the flow control means for supplying the working fluid to the torque converter, as in the illustrated embodiments, serves to effectively prevent excess amount of working fluid from being supplied to the torque converter, and to thereby reduce the load on the first oil pump and optimize the operation efficiency of the entire hydraulic system.

While the present invention has been explained with reference to certain specific embodiments, they were presented by way of examples only, and it is of course that various modifications and/or alterations may be made without departing from the scope of the invention which is defined in the following claims.

What is claimed is:

1. A hydraulic system for an automatic power transmission including a torque converter and a transmission mechanism, comprising:
   a lubrication circuit for lubricating components of said transmission mechanism;
   a hydraulic control circuit for controlling operation of said automatic transmission;
   first pressurized fluid source means for supplying pressurized fluid to said hydraulic control circuit;
   second pressurized fluid source means, driven independently of said first pressurized fluid source means, for supplying pressurized fluid to said lubrication circuit; and
   vale means for normally allowing independent supply of fluid pressure from said first and second fluid pressure source means to an associated lubrication circuit and a hydraulic control circuit, respectively, said valve means being responsive to one of said first and second fluid pressure source means when it assumes a state in which it does not supply pressurized fluid to the associated circuit, for establishing fluid communication between the other of said first and second fluid source means and that circuit which is associated with said one of said first and second fluid pressure source means.

2. A hydraulic system for an automatic power transmission including a torque converter and a transmission mechanism, comprising:
   a lubrication circuit for lubricating components of said transmission mechanism;

a hydraulic control circuit for controlling operation of said automatic transmission;

first pressurized fluid source means for supplying pressurized fluid to said hydraulic control circuit;

second pressurized fluid source means, operative independently of said first pressurized fluid source means, for supplying pressurized fluid to said lubrication circuit; and flow control means, provided in a fluid path for recirculating working fluid through said hydraulic control circuit to said torque converter, for adjusting the flow rate of the fluid recirculating to said torque converter depending upon the load of said torque converter.

3. The hydraulic system as set forth in claim 2, wherein said flow control means is a temperature-responsive flow control means for increasing the flow rate of the fluid flowing therethrough, in accordance with the increase in fluid temperature.

4. A hydraulic system for an automatic power transmission including a torque converter and a transmission mechanism, comprising:

a lubrication circuit for lubricating components of said transmission mechanism;

a hydraulic control circuit for controlling operation of said automatic transmission;

first pressurized fluid source means for supplying pressurized fluid to said hydraulic control circuit; and second pressurized fluid source means driven independently of said first pressurized fluid source means, for supplying pressurized fluid to said lubrication circuit;

wherein one of said first and second pressurized fluid source means is associated with an input shaft of said automatic transmission to be driven by driving torque transmitted therethrough, and the other of said first and second pressurized fluid source means is associated with an output shaft of said automatic transmission to be driven by driving torque transmitted therethrough; and valve means, adapted to cooperate with said the other of said first and second pressurized fluid source means, for switching the fluid flow direction across said the other pressurized fluid source means when it is driven in a reverse direction.

5. A hydraulic circuit system for an automatic power transmission unit for an automotive vehicle, said automatic power transmission unit incorporating a torque converter, a transmission casing, and a power transmission mechanism accommodated within said transmission casing and including a gear train shiftable for establishing one of a plurality of transmission speed ratios between input and output shafts of the power transmission mechanism, said hydraulic circuit system comprising:

a control circuit for supplying a control pressure to said power transmission mechanism in order to establish a desired one of said transmission speed ratios;

a lubrication circuit for supplying lubricating fluid for lubrication of said gear train, said lubrication circuit being fabricated independently of said control circuit;

first pressurized fluid source means, mounted on said transmission casing and driven by driving torque transmitted across said automatic transmission, for supplying said control pressure to said control circuit; and second pressurized fluid source means, mounted on said transmission casing and driven by driving torque transmitted across said automatic transmission and driven independently of said first fluid source means, for supplying said lubricating fluid for said lubrication circuit;

wherein one of said first and second pressurized fluid source means is coupled with said input shaft to be driven by the input torque transmitted therethrough, and the other of said first and second pressurized fluid source means is coupled with said output shaft to be driven by the output torque transmitted therethrough, and wherein said first and second pressurized fluid source means are connected to a common working fluid reservoir means, and said the other of said first and second fluid source means is connected to said common working fluid reservoir means via a pair of paths, one of which is adapted to suck the working fluid therein and the other of which is adapted to recirculate part of the working fluid to a suction side of said the other of said first and second fluid source means, said pair of paths being communicated across a valve means for preventing surge flow of working fluid thereacross, and said pair of paths switching functions of sucking and recirculating the working fluid depending upon the driving direction of said output shaft.

6. The hydraulic circuit system as set forth in claim 5, further comprising a lubricating fluid supply switching valve, disposed between said lubrication circuit and a return path for recirculating control pressure path through said control circuit to said working fluid reservoir means, said lubricating fluid supply switching valve being responsive to the pressure level of said lubricating fluid supplied from said second pressurized fluid source means, for blocking fluid communication therebetween while said lubricating fluid pressure level is higher than a predetermined pressure level, and for establishing fluid communication therebetween while the lubricating fluid pressure level is lower than said predetermined pressure level.

7. The hydraulic circuit system as set forth in claim 6, further comprising fail-safe circuit means for establishing communication between said second pressurized fluid source means and said control circuit, said fail-safe circuit means being normally placed in an inactive state for blocking fluid communication between said second pressurized fluid source means and said control circuit and responsive to failure of one of said first and second pressurized fluid source means for establishing fluid communication between said control circuit and said pressurized fluid source means.

8. The hydraulic circuit system as set forth in claim 7, wherein said automatic power transmission is coupled with a differential gear unit for forming an automatic transaxle, said second pressurized fluid source means comprising an gear pump formed by an output gear which is driven by said output shaft, and an idler gear which is mounted on a counter shaft of said differential gear unit.

9. A hydraulic circuit system for an automatic power transmission unit for an automotive vehicle, said automatic power transmission unit incorporating a torque converter, a transmission casing, and a power transmission mechanism accommodated within said transmission casing and including a gear train shiftable for establishing one of a plurality of transmission speed ratios between input and output shafts of the power transmission mechanism, said hydraulic circuit system comprising:

- a control circuit for supplying a control pressure to said power transmission mechanism in order to establish a desired one of said transmission speed ratios;
- a lubrication circuit for supplying lubricating fluid for lubrication of said gear train, said lubrication circuit being fabricated independently of said control circuit;
- first pressurized fluid source means, mounted on said transmission casing and driven by driving torque transmitted across said automatic transmission, for supplying said control pressure to said control circuit;
- second pressurized fluid source means, mounted on said transmission casing and driven by driving torque transmitted across said automatic transmission and driven independently of said first fluid source means, for supplying said lubricating fluid for said lubrication circuit; and
- fail-safe circuit means for establishing at least one of communications between said first pressurized fluid source means and said lubrication circuit, and between said second pressurized fluid source means and said control circuit, said fail-safe circuit means being normally placed in an inactive state and responsive to failure of one of said first and second pressurized fluid source means, for establishing fluid communication between the normally operating pressurized fluid source means and one of said lubrication circuit and said control circuit associated with the faulty pressurized fluid source means.

10. A hydraulic circuit system for an automatic power transmission unit for an automotive vehicle, said automatic power transmission unit incorporating a torque converter, a transmission casing and a power transmission mechanism accommodated within said transmission casing and including a gear train shiftable for establishing one of a plurality of transmission speed ratios between input and output shafts of the power transmission mechanism, said hydraulic circuit system comprising:

- a control circuit for supplying a control pressure to said power transmission mechanism in order to establish a desired one of said transmission speed ratios;
- a lubrication circuit for supplying lubricating fluid for lubrication of said gear train, said lubrication circuit being fabricated independently of said control circuit;
- first pressurized fluid source means, mounted on said transmission casing and driven by driving torque transmitted across said automatic transmission, for supplying said control pressure to said control circuit;
- second pressurized fluid source means, mounted on said transmission casing and driven by driving torque transmitted across said automatic transmission and operable independently of said first fluid source means, for supplying said lubricating fluid for said lubrication circuit; and
- flow control means, disposed in a fluid path connecting said control circuit and a working fluid source means, for recirculating the working fluid from said control circuit to said working fluid source means, said flow control means being adapted to adjust the fluid flow rate recirculating to said working fluid source depending upon the operational load on said torque converter, utilizing working fluid in said fluid source means for operation.

11. The hydraulic circuit system as set forth in claim 10, wherein said flow control means includes means for adjusting the fluid recirculation rate by detecting the operational load on said torque converter.

12. The hydraulic circuit system as set forth in claim 11, wherein said adjusting means is adapted to detect fluid temperature as a parameter representative of the operational load on said torque converter.

13. A hydraulic system for an automatic power transmission with a torque converter, comprising:

- first circuit means, connected to a first load, for supplying a first fluid pressure to said first load so that said first load performs a predetermined first function for the automatic power transmission;
- second circuit means, connected to a second load of the automatic power transmission, for supplying a second fluid pressure to said second load so that said second load performs a predetermined second function for said automatic power transmission;
- first pressurized fluid source means for supplying pressurized fluid to said first circuit means; and
- second pressurized fluid source means, operative independently of said first pressurized fluid source, for supplying pressurized fluid to said second circuit means, said second pressurized fluid source means being operative in a first mode for supplying fluid pressure in a first direction, and a second mode for supplying fluid pressure in a second direction opposite to said first direction or for stopping supply of fluid pressure; and
- means, responsive to said second pressurized fluid source means operating in said first mode, for blocking fluid communication between said first and second circuit means so that pressurized fluid is supplied to said second circuit means from said second pressurized fluid source means, and responsive to said second pressurized fluid source means operating in said second mode, for establishing fluid communication between said first circuit means and said second circuit means in order to supply fluid pressure in said first circuit means to said second circuit means in order to supply fluid pressure in said first circuit means to said second circuit means.

* * * * *